(12) United States Patent
Patty et al.

(10) Patent No.: US 11,987,395 B2
(45) Date of Patent: May 21, 2024

(54) THRUSTING RAILS FOR LAUNCH VEHICLES, AND ASSOCIATED SYSTEMS AND METHODS

(71) Applicant: Blue Origin, LLC, Kent, WA (US)

(72) Inventors: Scott D. Patty, Kent, WA (US); Park O. Cover, Jr., Orting, WA (US); Mathew John Theis, Seattle, WA (US); Robert E. McMullen, Redmond, WA (US)

(73) Assignee: Blue Origin, LLC, Kent, WA (US)

( * ) Notice: Subject to any disclaimer, the term of this patent is extended or adjusted under 35 U.S.C. 154(b) by 231 days.

(21) Appl. No.: 17/341,256

(22) Filed: Jun. 7, 2021

(65) Prior Publication Data

US 2022/0388695 A1   Dec. 8, 2022

(51) Int. Cl.
*B64G 1/64* (2006.01)
(52) U.S. Cl.
CPC .................... *B64G 1/645* (2013.01)
(58) Field of Classification Search
CPC ........ B64G 1/645; B64G 1/002; B64G 1/641; B64G 1/22; F42B 15/36; F42B 15/38
See application file for complete search history.

(56) References Cited

U.S. PATENT DOCUMENTS

| | | |
|---|---|---|
| 933,070 A | 9/1909 | Gleanson |
| 2,468,274 A * | 4/1949 | Riley .................... F42B 3/02 |
| | | 102/317 |
| 2,807,429 A | 9/1957 | Hawkins et al. |
| 3,814,350 A | 6/1974 | Fletcher |
| 3,966,142 A | 6/1976 | Corbett et al. |
| 4,112,365 A | 9/1978 | Larson et al. |
| 4,479,622 A | 10/1984 | Howse |
| 4,601,446 A | 7/1986 | Opshal |

(Continued)

FOREIGN PATENT DOCUMENTS

| | | |
|---|---|---|
| CN | 101136605 | 3/2008 |
| CN | 100542007 | 9/2009 |

(Continued)

OTHER PUBLICATIONS

Demir et al., "A Novel Dual Three-Phase Permanent Magnet Sychronous Motor with Asymmetric Stator Winding," IEEE Transactions on Magnetics, vol. 52, No. 7, Jul. 2016, 5 pages.

(Continued)

*Primary Examiner* — Medhat Badawi
*Assistant Examiner* — Vicente Rodriguez
(74) *Attorney, Agent, or Firm* — Hogan Lovells US LLP (57) ABSTRACT

The present technology is directed to thrusting rails for launch vehicles, and associated systems and methods. Certain embodiments of the thrusting rails can include a first rail housing portion having a cavity and a second rail housing portion having a projection positioned at least partially within the cavity. The rails can include a bellows positioned within the cavity and an elongated tube positioned within the bellows. The elongated tube can include a vent opening in a lateral wall of the elongated tube. A shield can be positioned between the vent opening at the bellows and a sleeve can be positioned within the elongated tube. The sleeve can be constructed from a fibrous material and positioned to retain an ordnance within the elongated tube.

24 Claims, 12 Drawing Sheets

(56) References Cited

U.S. PATENT DOCUMENTS

| | | | |
|---|---|---|---|
| 4,608,926 A * | 9/1986 | Stevens | F42D 1/043 89/1.14 |
| 4,842,223 A | 6/1989 | Allton et al. | |
| 4,854,010 A | 8/1989 | Maraghe et al. | |
| 4,964,340 A | 10/1990 | Daniels et al. | |
| 5,052,638 A | 10/1991 | Minovitch | |
| 5,104,070 A | 4/1992 | Johnson | |
| 5,242,135 A | 9/1993 | Scott | |
| 5,318,256 A | 6/1994 | Appleberry et al. | |
| 5,372,071 A * | 12/1994 | Richards | F42B 15/38 102/378 |
| 5,568,901 A | 10/1996 | Stiennon | |
| 5,605,308 A | 2/1997 | Quan | |
| 5,628,476 A | 5/1997 | Soranno | |
| 5,667,167 A | 9/1997 | Kistler | |
| 5,678,784 A | 10/1997 | Marshall, Jr. et al. | |
| 5,743,492 A | 4/1998 | Chan | |
| 5,816,539 A | 10/1998 | Chan | |
| 5,898,123 A * | 4/1999 | Fritz | C06C 5/06 102/378 |
| 5,927,653 A | 7/1999 | Mueller et al. | |
| 6,053,454 A | 4/2000 | Smolik | |
| 6,176,451 B1 | 1/2001 | Drymon | |
| 6,193,187 B1 | 2/2001 | Scott et al. | |
| 6,206,327 B1 | 3/2001 | Benedetti | |
| 6,220,546 B1 | 4/2001 | Klamka et al. | |
| 6,247,666 B1 | 6/2001 | Baker et al. | |
| 6,354,540 B1 | 3/2002 | Lewis | |
| 6,357,699 B1 | 3/2002 | Edberg | |
| 6,364,252 B1 | 4/2002 | Anderman | |
| 6,454,216 B1 | 9/2002 | Kiselev et al. | |
| 6,457,306 B1 | 10/2002 | Abel et al. | |
| 6,666,402 B2 | 12/2003 | Rupert et al. | |
| 6,817,580 B2 | 11/2004 | Smith | |
| 6,926,576 B1 | 8/2005 | Alway et al. | |
| 7,543,779 B1 | 6/2009 | Lewis | |
| 7,659,686 B2 | 2/2010 | Osada et al. | |
| 7,710,081 B2 | 5/2010 | Saban et al. | |
| 7,957,942 B2 | 6/2011 | Ivchenko et al. | |
| 8,393,582 B1 | 3/2013 | Kutter | |
| 8,695,473 B2 * | 4/2014 | Kametz | F42B 15/38 102/378 |
| 8,727,654 B2 * | 5/2014 | Graham | F42B 15/38 102/378 |
| 9,027,481 B2 * | 5/2015 | Kister | F42B 15/38 102/378 |
| 9,302,793 B2 | 4/2016 | Ghofranian | |
| 9,484,852 B2 | 11/2016 | Timmons et al. | |
| 9,796,488 B2 | 10/2017 | Cook | |
| 9,963,250 B2 | 5/2018 | Bultel | |
| 10,189,556 B2 | 1/2019 | Minchau et al. | |
| 10,205,416 B2 | 2/2019 | Furukawa | |
| 10,279,933 B2 | 5/2019 | Lakshmanan | |
| 10,328,970 B2 | 6/2019 | Keum | |
| 10,351,268 B2 | 7/2019 | Estevez | |
| 10,407,965 B2 | 9/2019 | Alford et al. | |
| 10,689,133 B2 | 6/2020 | Cheynet de Beaupre et al. | |
| 11,467,003 B1 | 10/2022 | Parodi | |
| 2003/0102862 A1 | 6/2003 | Goto et al. | |
| 2003/0150961 A1 | 8/2003 | Boelitz et al. | |
| 2003/0192984 A1 | 10/2003 | Smith | |
| 2005/0278120 A1 | 12/2005 | Manfred et al. | |
| 2006/0049316 A1 | 3/2006 | Antonenko et al. | |
| 2006/0113425 A1 | 6/2006 | Rader | |
| 2006/0250042 A1 | 11/2006 | Neet | |
| 2007/0012820 A1 | 1/2007 | Buehler | |
| 2008/0078884 A1 | 4/2008 | Trabandt et al. | |
| 2010/0213244 A1 | 8/2010 | Miryekta et al. | |
| 2013/0221162 A1 | 8/2013 | Darooka | |
| 2017/0047728 A1 | 2/2017 | Benarous et al. | |
| 2017/0225808 A1 | 8/2017 | Echelman | |
| 2017/0327252 A1 | 11/2017 | Lim | |
| 2018/0055227 A1 | 3/2018 | Jones et al. | |
| 2018/0056793 A1 | 3/2018 | Rozman et al. | |
| 2018/0186479 A1 | 7/2018 | Johnson | |
| 2020/0024011 A1 | 1/2020 | Isayama | |
| 2020/0102102 A1 | 4/2020 | Liu | |
| 2020/0270002 A1 | 8/2020 | Johnson | |
| 2020/0307461 A1 | 10/2020 | Johnson | |
| 2021/0031952 A1 | 2/2021 | Moran | |
| 2022/0255623 A1 | 8/2022 | Jevremovic | |
| 2022/0388695 A1 | 12/2022 | Patty | |
| 2023/0003555 A1 | 1/2023 | Parodi | |

FOREIGN PATENT DOCUMENTS

| | | |
|---|---|---|
| CN | 102132483 | 7/2011 |
| CN | 103580584 | 2/2014 |
| CN | 104160612 | 11/2014 |
| CN | 105763116 | 5/2019 |
| EP | 3131198 | 2/2017 |
| EP | 2412091 | 8/2018 |
| KR | 10-0779798 | 11/2007 |
| KR | 20-2014-0002805 | 5/2014 |
| WO | WO-2016003807 | 1/2016 |

OTHER PUBLICATIONS

Giangrande et al., "Design of Fault-Tolerant Dual Three-Phase Winding PMSM for Helicopter Landing Gear EMA," https://www.researchgate.net/publication/328848285, Nov. 2018, 6 pages.

Ito et al., "Optimal Design of a Mechanism Used for Opening and Shutting a Ship's Hatch Cover". J. Mech., Trans., and Automation. Dec. 1984, 106(4), 7 pages.

Kelly et al., International Docketing Standard (IDSS) Interface Definition Document (IDD), No. HQ-E-DAA-TN39050, Oct. 2016, 142 pages.

Recalde, Raul Igmar Gregor, "The Asymmetrical Dual Three-Phase Induction Machine and the MBPC in the Speed Control," InTech Open Science, Open Minds, Chapter 16, 2012, 16 pages.

Zhu et al., "Design Considerations of Fault-Tolerant Electromechanical Actuator Systems for More Electric Aircraft (MEA)," IEEE, 2008 7 pages.

* cited by examiner

THRUSTING RAILS FOR LAUNCH VEHICLES, AND ASSOCIATED SYSTEMS AND METHODS

TECHNICAL FIELD

The present technology is directed generally to thrusting rails for separating components of a rocket or other space vehicle.

BACKGROUND

Explosive separation systems are often used to separate components of space or launch vehicles during flight. For example, explosive separation systems may be used to separate payload fairing sections from each other and/or from another stage of a rocket or other vehicle. There remains a need in the industry for improved thrusting rails that provide consistent and reliable separation of components during flight.

DETAILED DESCRIPTION

Embodiments of the technology disclosed herein are directed generally to systems and methods for separating fairings and other space vehicle portions from each other during flight. These systems include thrusting rail assemblies having, among other features, explosive ordnance wrapped in (e.g., surrounded by or enclosed within) sleeves. The sleeves can be constructed from paper or other material configured to fracture, disintegrate, or otherwise deconstruct without producing shrapnel when the ordnance detonates.

Several embodiments of the present technology are directed to thrusting rail assemblies (and methods of manufacturing thereof) having a first rail housing portion having two or more walls and a cavity between the walls. The assembly can have a second rail housing portion having a projection or piston positioned at least partially within the cavity. A bellows can be positioned within the cavity and an elongated tube can be positioned within the bellows. The elongated tube can include a vent opening in a lateral wall of the elongated tube. The assembly can include a shield positioned between the vent opening at the bellows and a sleeve positioned within the elongated tube, the sleeve constructed from a fibrous material and positioned to retain an ordnance within the elongated tube.

For clarity, well-known features generally associated with thrusting rails that may unnecessarily obscure some significant aspects of the presently disclosed technology are not set forth in the following description. Moreover, although the following disclosure sets forth several embodiments of the present technology, several other embodiments can have different configurations and/or different components than those described in this section. As such, the present technology may have other embodiments with additional elements, and/or without several of the elements described below with reference to FIGS. 1-15.

Several of the features are described below with reference to particular corresponding Figures. Any of the features described herein may be combined in suitable manners with any of the other features described herein, without deviating from the scope of the present technology.

One drawback with current thrusting rail technology is that precise positioning of ordnance within the thrusting rail is often not adequately controlled. Imprecise positioning and/or misalignment can lead to explosive forces directed in undesirable directions, which can lead to a failed separation operation and/or damage to payloads or other vehicle components. Additionally, using polymer and/or metal material to maintain the position of the ordnance can lead to shrapnel production when the ordnance detonates. The shrapnel can damage payloads or other vehicle components. Given the efforts and costs required to deliver payloads out of Earth's atmosphere, the ability to reliably separate fairings and other components is vital.

Figure 1:
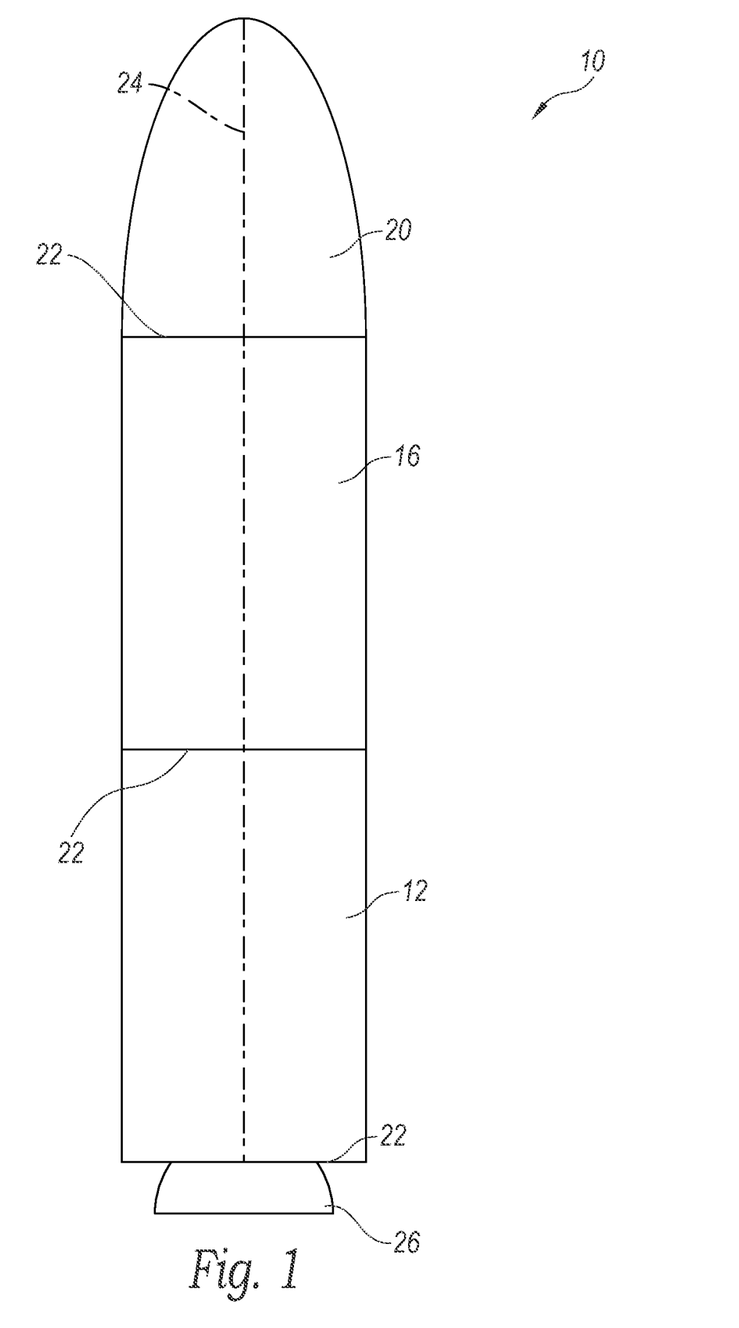
FIG. 1 is schematic illustration of a rocket configured in accordance with representative embodiments of the present technology.

FIG. 1 illustrates an embodiment of a rocket 10. The rocket 10 includes one or more stages (e.g., a first stage 12 and a second stage 16) and one or more engines configured to provide thrust. In the illustrated embodiment, the rocket 10 includes a fairing 20 or other payload cover. The fairing 20 protects a payload within the rocket 10 during launch and flight. The fairing 20, rocket stages 12, 16, and/or an engine 26 of the rocket 10 can be joined to each other at one or more joints 22 or seams. One or more of the stages and/or the fairing can include a longitudinal seam 24 or joint separating the individual stages 12, 16 and/or the fairing 20 into multiple portions. In some embodiments, the rocket 10 includes one or more fins or other guidance structures (not shown) carried by one or more of the stages of the rocket 10.

In some embodiments, the stages/fairing are configured to separate from each other during flight. For example, the first rocket stage 12 is configured to provide thrust at initial launch and during a first portion of the rocket flight. At the completion of the first portion of the flight of the rocket 10, the first stage 12 and first engine 26 separate from the second rocket stage 16. In some embodiments, the rocket 10 includes one or more secondary engines (not shown) connected to the second rocket stage 16 that provide thrust over a second portion of the rocket flight. In some applications, the rocket 10 can include additional stages and engines for additional portions of the rocket flight.

The fairing 20 can be configured to separate from the stages of the rocket 10 at a predetermined point during the rocket's flight (e.g., at a desired altitude. For example, the fairing 20 can separate from the rocket 10 after the rocket 10 exits the atmosphere. Separating the fairing 20 from the rocket 10 allows the payload to separate from the rocket 10. The payload can include, for example, a space vehicle, lander, satellite, space station/station portion, and/or other payload component.

In order to avoid damage to the payload(s), the fairing 20 can be configured to separate and move away from the rocket 10 with sufficient thrust/momentum to avoid contact with the payload(s) as the fairing 20 separates. The desired thrust can be provided by a thrusting rail, pusher springs, and/or other mechanism configured to push the fairing 20 away from the rocket 10 and/or push portions of the fairing 20 away from each other.

Figure 2:
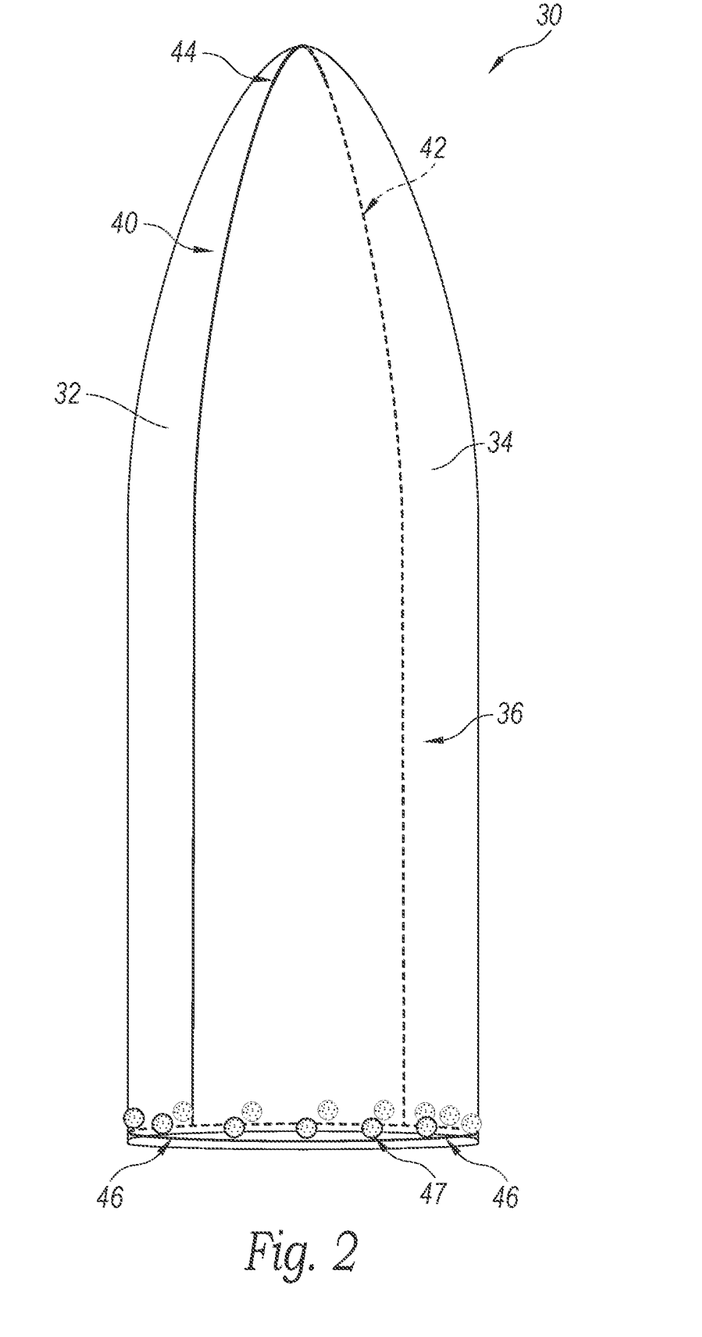
FIG. 2 is an illustration of a fairing of a rocket configured in accordance with representative embodiments of the present technology.

FIG. 2 illustrates an embodiment of a fairing 30 having first and second fairing portions 32, 34 releasably attached at a fairing joint 36. In some embodiments, the fairing 30 can be separated into three, four, or more portions via more than one fairing joint. The fairing joint 36 can be divided into two or more joint portions, wherein each joint portion includes one or more thrusting rail assemblies. For example, a first portion 40 of the fairing joint 36 can extend from the aft end of the fairing 30 to a point at or near a forward end of the fairing 30. A second portion 42 of the fairing joint can extend from the aft end of the fairing 30 toward the forward end on another portion of the fairing 30 (e.g., an opposite side of the fairing 30 from the first portion 40 of the fairing joint). In some embodiments, the first and second portions 40, 42 of the fairing joint 36 meet at or near the forward end of the fairing 30. In some embodiments, the fairing joint 36 includes a third portion 44 extending between the first and second portions 40, 42 (e.g., at or near the forward end of the fairing 30). The fairing joint 36 can be segregated into additional portions, depending on the embodiment. In some embodiments, each portion of the fairing joint 36 (or some subsets of the portions of the fairing joint 36) can have one or more thrusting rail assemblies connected thereto. In some embodiments, a single thrusting rail assembly is connected to and extends along all or most of the fairing joint 36.

The fairing 30 can include a stage joint 46 at an aft end of the fairing 30. The stage joint 46 can include, in some embodiments, a frangible joint or other structure configured to facilitate separating the fairing 30 from the rocket 10. In some embodiments, the stage joint 46 includes a thrusting rail. The stage joint 46 can include pusher springs 47 and/or other structures configured to push the fairing 30 away from the body of the rocket 10 (e.g., away from the final stage of the rocket 10) or other launch vehicle.

FIGS. 3-7 illustrate a thrusting rail assembly 50 configured in accordance with a representative embodiment of the present technology. The thrusting rail assembly 50 can be installed on one or more portions of the fairing joint 36 and/or the stage joint 46 (FIG. 2). The thrusting rail assembly 50 is illustrated as a straight component for simplicity. Thrusting rail assemblies 50 installed on the fairing 30 or other portion of the rocket 10 have shapes to match the shape of the joint or joint portion on which they are installed. The thrusting rail assembly 50 can be sized (e.g., manufactured to a specific length, height, and/or width) to accommodate a given installation. For example, in some applications, the thrusting rail assembly 50 has a length greater than 50 feet, greater than 70 feet, and/or greater than 100 feet. In some embodiments, the thrusting rail assembly 50 has a length between 5 to 15 feet, between 10 to 30 feet, between 20 to 60 feet, and/or between 50 to 120 feet.

Figure 3:
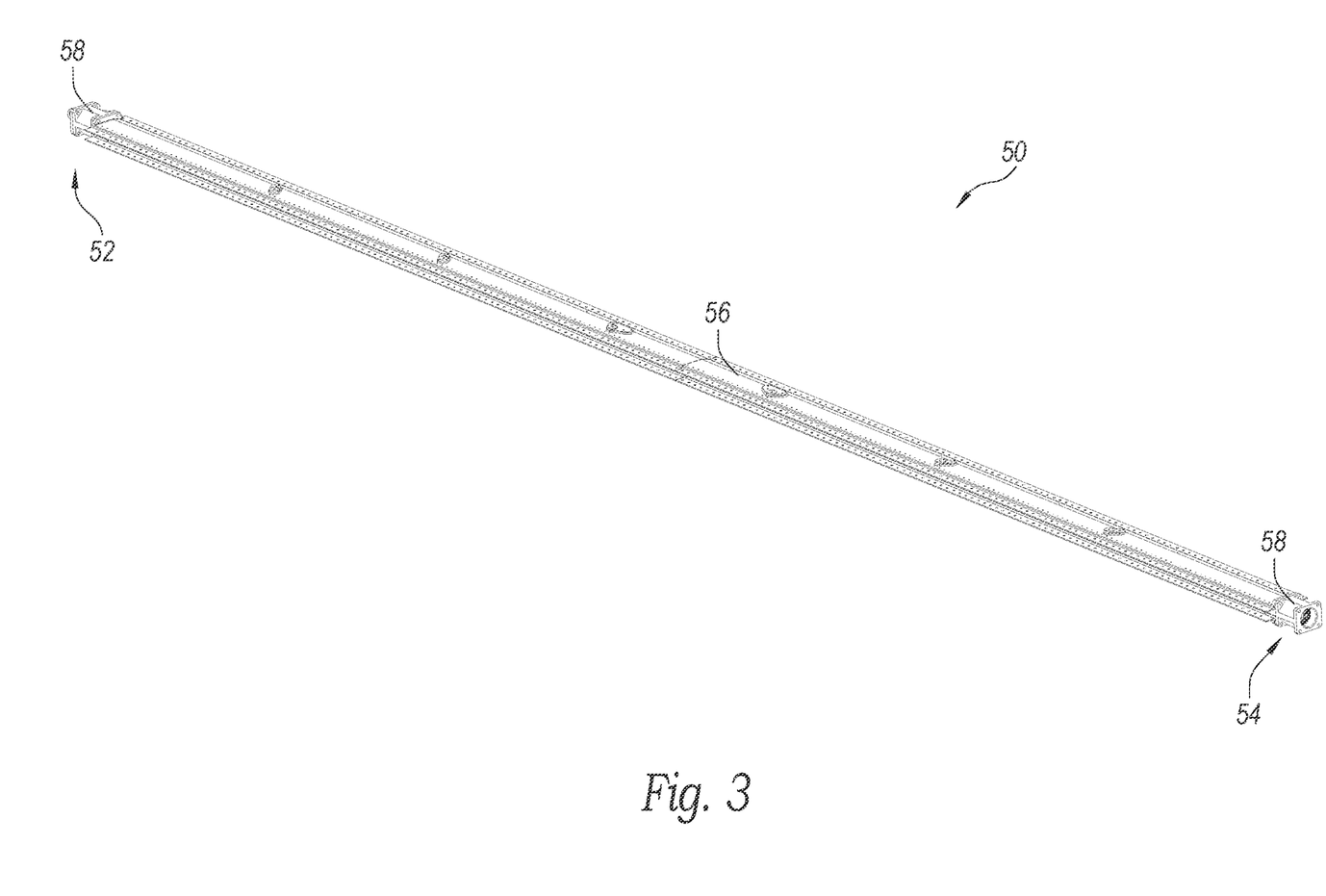
FIG. 3 is a perspective view of thrusting rail assembly configured in accordance with representative embodiments of the present technology.

The representative thrusting rail assembly 50 includes a first end 52, a second end 54, and a rail portion 56 extending between the first and second ends 52, 54. The first and second ends 52, 54 can include interfaces and/or manifolds 58 configured to mate with another portion of the rocket 10 and/or with another thrusting rail portion. In some embodiments, one or more of the first and second ends 52, 54 are sealed from the environment surrounding the thrusting rail assembly 50. In some embodiments, one or both of the first and second ends 52, 54 include a detonator 60, igniter, or other initiation device (described further below with reference to FIG. 4) and/or another actuator configured to actuate the thrusting rail assembly 50 to separate two or more portions of the fairing 30.

Figure 4:
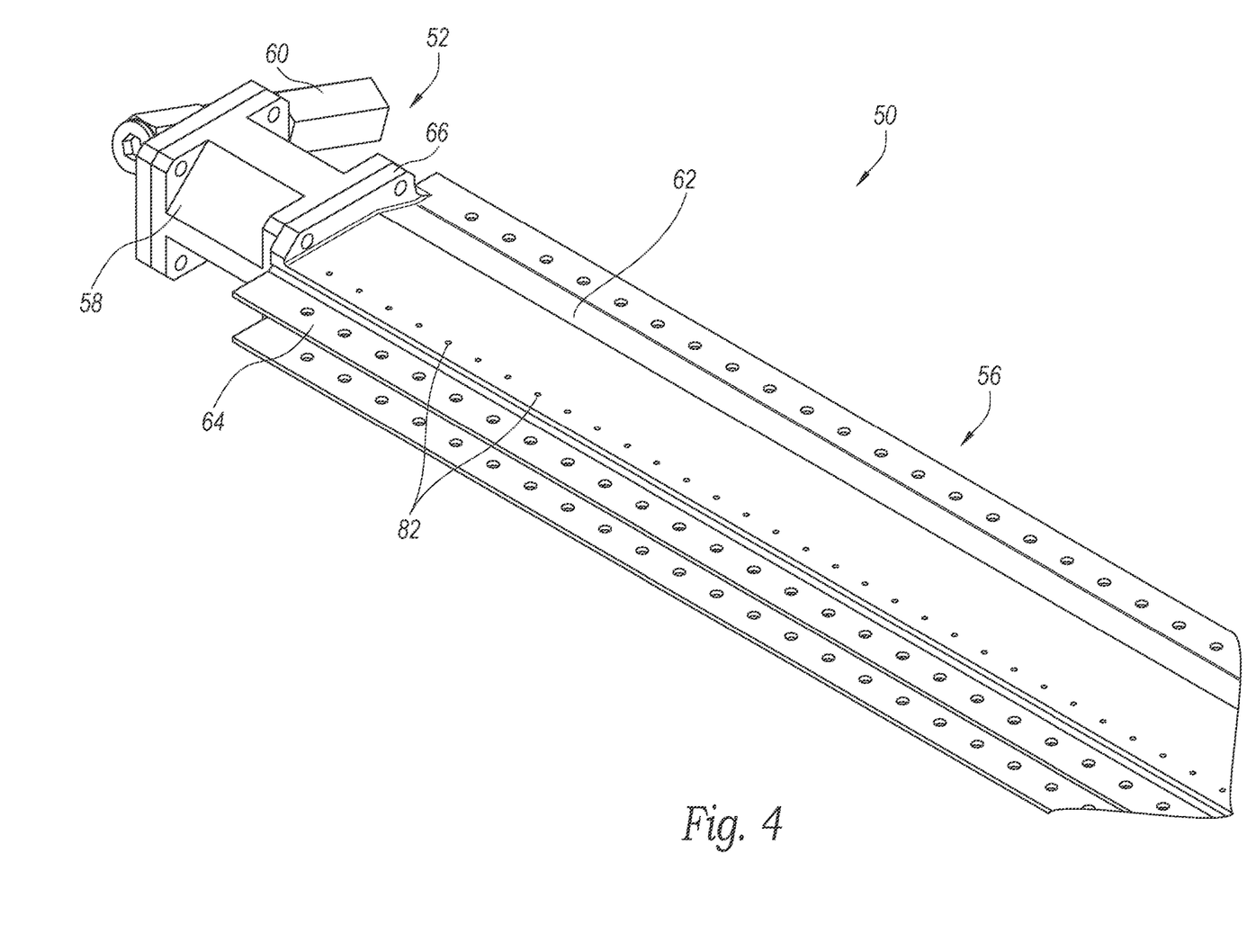
FIG. 4 is a close-up perspective view of the first end of the representative thrusting rail assembly of FIG. 3.
Figure 5:
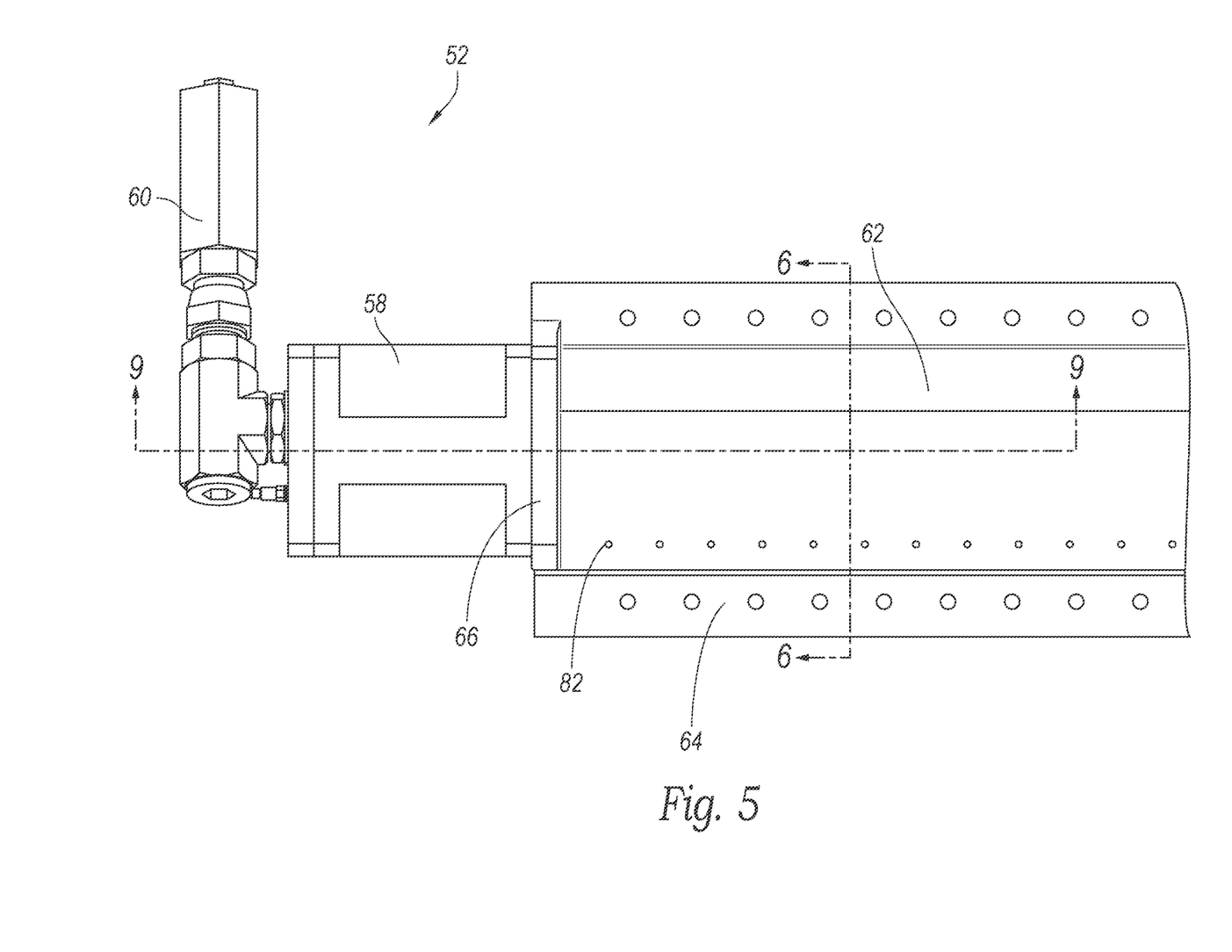
FIG. 5 is a top close-up view of the first end of the representative thrusting rail assembly of FIG. 3.

As illustrated in FIGS. 4 and 5, the rail portion 56 can include a first rail housing portion 62 and a second rail housing portion 64 connected to the first rail housing portion 62. The rail portion 56 can connect to a manifold 58 or other end structure. For example, the rail portion 56 (e.g., one or both the first and second rail housing portions 62, 64) can include a flange 66 or other mating interface configured to engage the manifold 58. In some embodiments, only one of the first or second rail housing portions 62, 64 is connected to the manifold 58, thereby permitting the other rail housing portion from the manifold 58 to separate. A detonator 60 can be connected to the manifold 58. In some embodiments, the detonator 60 is connected directly to one or both of the first and second rail housing portions 62, 64. As explained in more detail below, the detonator 60 can be configured to detonate an ordnance within the rail portion 56 of the thrusting rail assembly 50.

Figure 6:
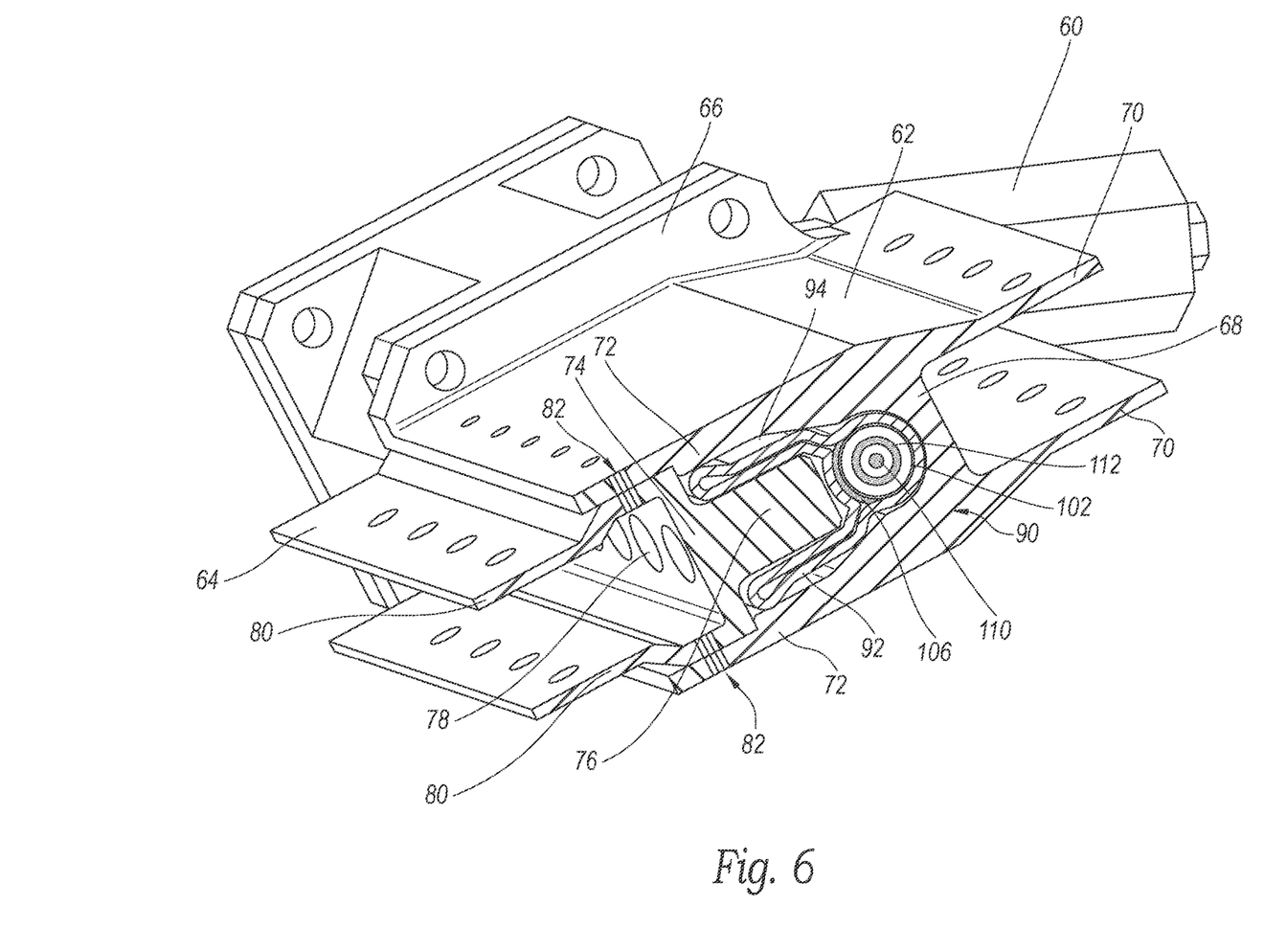
FIG. 6 is a perspective cross-sectional view of the representative thrusting rail assembly of FIG. 3, as viewed along the cut plane 6-6 of FIG. 5.

Referring to FIG. 6, the first rail housing portion 62 can include a main body portion 68 (e.g., a cylinder) extending along all or most of the length of the rail portion 56 shown in FIG. 3. The first rail housing portion 62 can include a first pair of flanges 70 or walls extending from the main body portion 68 of the first rail housing portion 62. A second pair of flanges 72 or walls can extend from the main body portion 68 of the first rail housing portion 62 (e.g., in a direction opposite or otherwise away from the first pair of flanges 70).

The second rail housing portion 64 can include a main body portion 74. In some embodiments, the second rail housing portion 64 includes a piston portion 76. The piston portion 76 can extend from the main body portion 74 of the second rail housing portion 64. The piston portion 76 can be, for example a projection, protrusion, ridge, or other structure configured to be positioned at least partially within the first rail housing portion 62. The piston portion 76 can include one or more cavities 78, cutouts, pockets, and/or other voids. For example, the piston portion 76 can include one or more of cavities 78 separated from each other and extending through a majority of the depth of the piston portion 76, as measured in the direction in which the piston portion 76 extends from the main body portion 74 of the second rail housing portion 64. The cavities 78 within the piston portion 76 can reduce the overall weight of the second rail housing portion 64. Reducing the weight of the second rail housing portion 64 can reduce the force required to separate the second rail housing portion 64 from the first rail housing portion 62. In some applications, it may be desirable to reduce or eliminate the cavities 78 to increase the weight of the second rail housing portion 64 (e.g., to tune a breathing frequency of the fairing 30). Correctly tuning the breathing frequency (i.e., the rate at which the radius of curvature of the fairing portions 32, 34 (FIG. 2) changes or the rate at which the fairing portions 32, 34 expand/contract in response to detonation of an ordnance within the thrusting rail assembly 50) can reduce the risk that the fairing portions 32, 34 impact the payload after separation. In some embodiments, the second rail housing portion 64 includes a pair of flanges 80 extending from the main body portion 74. The flanges 80 can extend in a direction away from the piston portion 76 with respect to the main body portion 74 of the second rail housing portion 64. The pair of flanges 80 can extend along all or most of the length of the second rail housing portion 64. In some embodiments, notches, cutouts, or other features can be formed in one or both of the pair flanges 80 to separate the flanges 80 into multiple flange portions along the length of the second rail housing portion 64.

In some embodiments, at least a portion of the second rail housing portion 64 is positioned within the first housing portion 62. For example, the piston portion 76 of the second rail housing portion 64 can extend at least partially into a space between the second pair of flanges 72 of the first rail housing portion 62. The first and second rail housing portions 62, 64 can be connected to each other via one or more fasteners, bolts, rivets, and/or other connection structures. For example, the first and second rail housing portions 62, 64 can include apertures 82 (see FIG. 6) through which bolts 84 (see FIG. 7), rivets, or other fasteners can be inserted. The pair of flanges 80 of the second rail housing portion 64 can be configured to receive and couple with the second portion of the fairing 34 (e.g., via one or more bolts 86 or other fasteners, welds, adherents, or other forms of affixation). The first pair of flanges 70 of the first rail housing portion 62 can be configured to receive and couple with the first portion of the fairing 32 (e.g., via one or more bolts or other fasteners, welds, adherents, or other forms of affixation).

Figure 7:
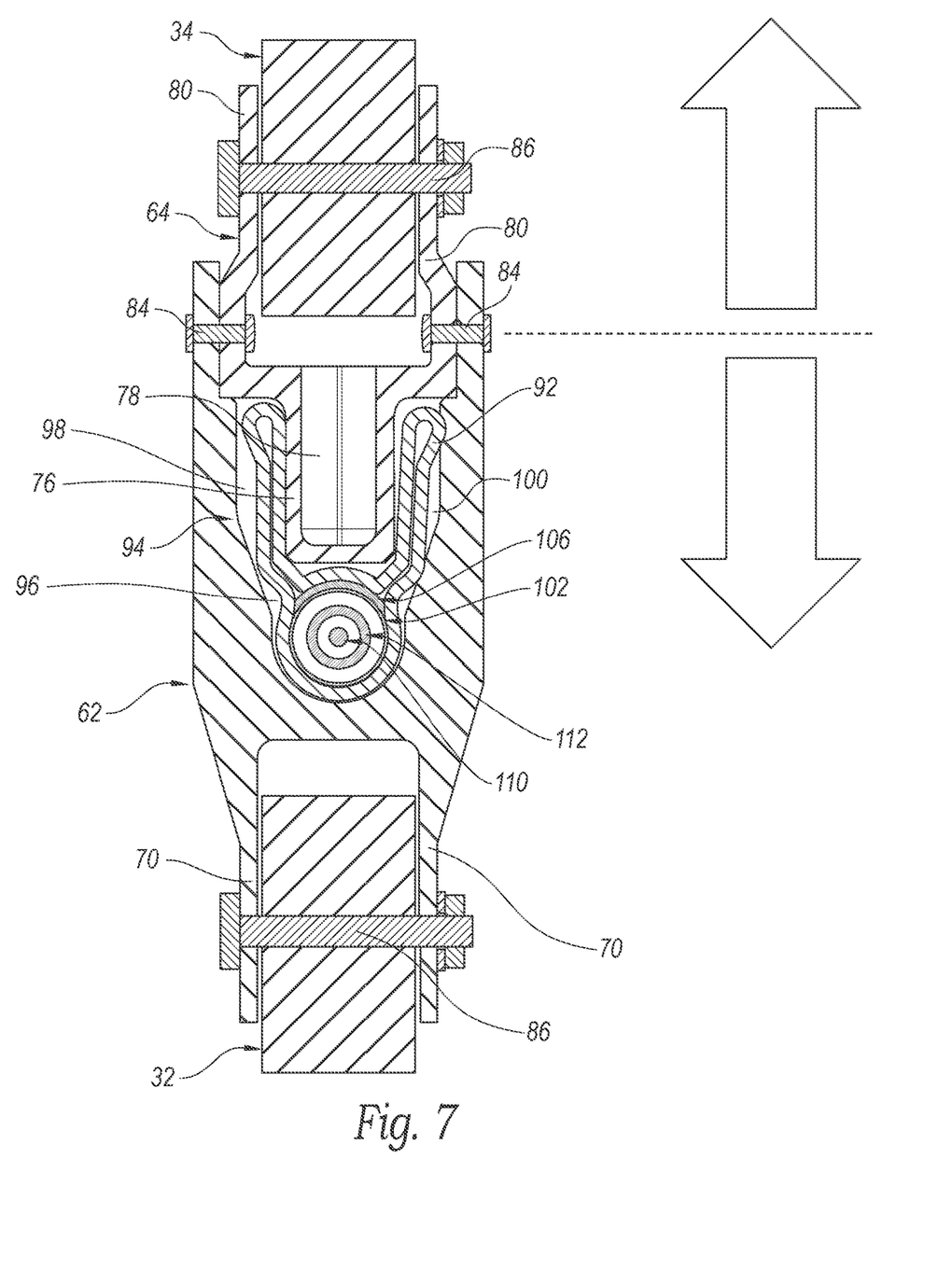
FIG. 7 is a cross-sectional plan view of the representative thrusting rail assembly of FIG. 3, as viewed along the cut plane 6-6 of FIG. 5.

The thrusting rail assembly 50 includes a thrusting assembly 90 within the rail portion 56. As illustrated in FIGS. 6-7, the thrusting assembly 90 can include a bellows 92. The bellows 92 can be constructed from a flexible and/or resilient material configured to withstand pressure and forces resulting from detonation of an ordnance within the bellows 92. The bellows 92 can be configured to contain all or substantially all gasses and other materials generated by detonating an ordnance within the bellows 92. The bellows 92 is positioned within a bellows cavity 94. The bellows cavity 94 is defined, at least in part, by inner surfaces of the first and second rail housing portions 62, 64. For example, the space between the main bodies 68, 74 of the first and second rail housing portions 62, 64 and between the second pair flanges 72 of the first rail housing portion 62 can form boundaries of the bellows cavity 94. In some embodiments, as illustrated in FIG. 7, the bellows cavity 94 includes a first cavity portion 96 and one or more additional cavity portions extending from the first cavity portion. For example, second and third cavity portions 98, 100 (e.g., wings) can extend from the first cavity portion 96 to form a generally "U" shaped cross section where the first cavity portion 96 forms the base of the "U" and the second and third cavity portions 98, 100 form the arms of the "U." In some embodiments, the second and third cavity portions 98, 100 extend on opposite sides of the piston portion 76 of the second rail housing portion 64.

In some embodiments, the bellows 92 has a generally circular, oval-shaped, rectangular, or other cross-sectional shape in the absence of the deforming forces on the bellows 92. When positioned within the bellows cavity 94, the bellows 92 can deform to fit within the cavity portions of the bellows cavity 94. In some embodiments, during assembly, the bellows 92 is first positioned between the second pair flanges 72 of the first rail housing portion 62. The piston portion 76 of the second rail housing portion 64 is then inserted between the second pair flanges 72 of the first rail housing portion 62, thereby deforming the bellows 92 and at least partially surrounding the piston portion 76.

Figure 8:
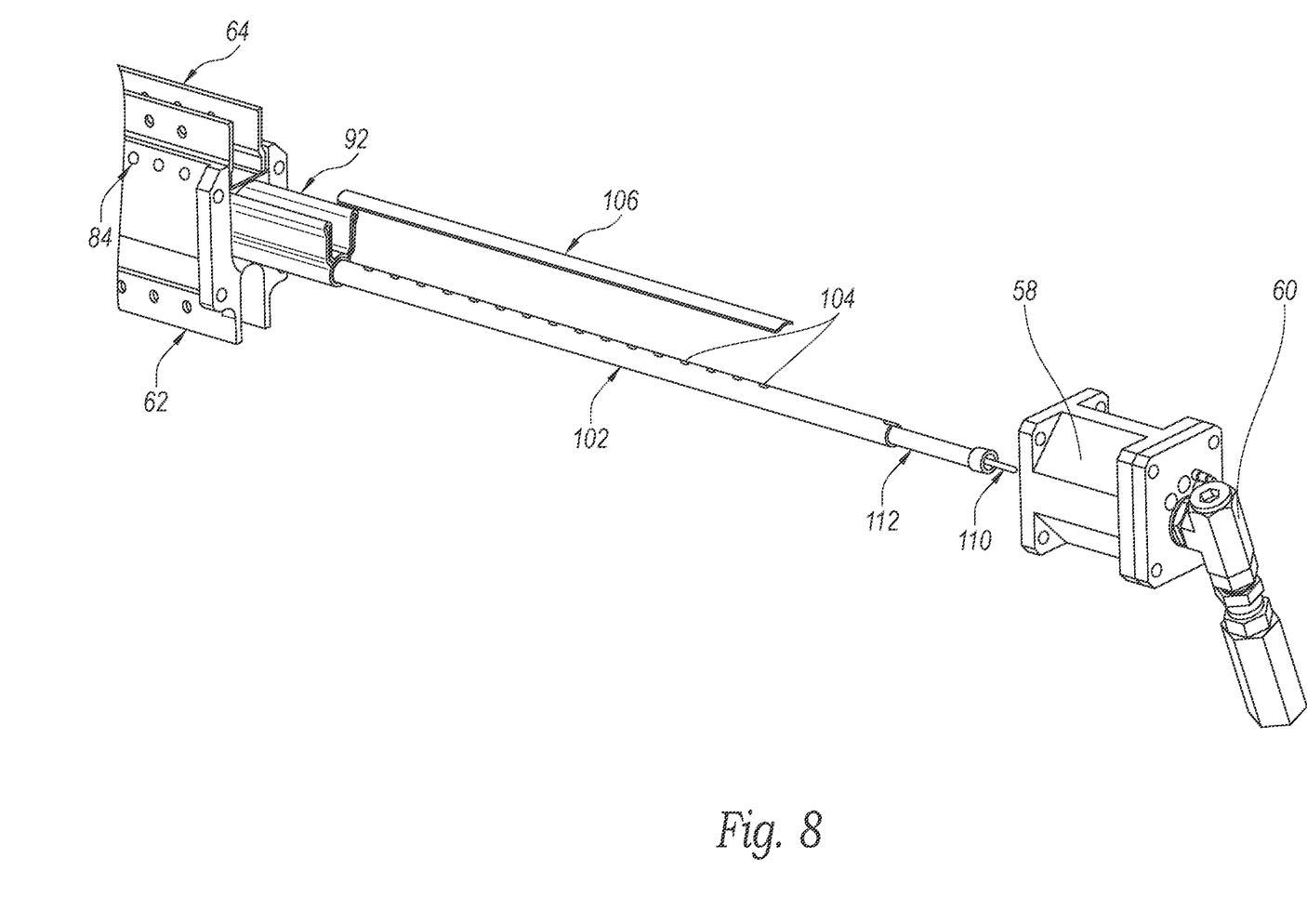
FIG. 8 is an exploded view of the representative thrusting rail assembly of FIG. 3.

The thrusting assembly can include an orifice tube 102 positioned within the bellows 92. The orifice tube 102 can be, in some embodiments, an elongated tube and can be cylindrical or substantially cylindrical. The orifice tube 102 can be constructed from a metal or other material configured to withstand a blast force from within the orifice tube without rupturing. For example, the orifice tube 102 can be formed from stainless steel (e.g., 304 Stainless, 21-6-9 Stainless Steel, ASTM-A269, ASTM-A213, and/or 316 Stainless Steel), titanium, aluminum, and/or other appropriate materials. As illustrated in FIG. 8, the orifice tube 102 includes a plurality of holes 104 formed on one side of the orifice tube 102. Preferably, the holes 104 or on a side of the orifice tube 102 facing the piston portion 76 of the second rail housing portion 64 when the thrusting rail assembly 50 is assembled. In some embodiments, the thrusting assembly 90 includes one or more shields 106 positioned within the bellows 92. The one or more shields 106 can be positioned between the holes 104 of the orifice tube 102 in the piston 76. The one or more shields 106 can be constructed from a material configured to withstand heat and blast forces emanating from the holes 104 in the orifice tube 102. For example, the one or more shields 106 can be constructed from a material the same as or similar to the material of the orifice tube 102. The one or more shields 106 can be configured to reduce the risk of damage to the bellows 92 from heat and/or blast force impingement from the orifice tube. In some embodiments, the one or more shields 106 have a generally elongate shape and a profile fit to match or substantially match and outer profile of the orifice tube 102. For example, the one or more shields 106 can be elongate and curved about an axis parallel to the length of the shield 106.

The thrusting assembly 90 includes an ordnance 110 within the orifice tube 102. The ordnance 110 can be a detonating cord or other explosive material. The ordnance 110 can be configured to detonate in response to a signal from a controller or other component.

In some embodiments, the ordnance 110 is surrounded by a sleeve 112 (e.g., a charge holder). The sleeve 112 can be constructed from a fibrous, lightweight, low-density, and/or consumable material. For example, the sleeve 112 can be constructed from paper (e.g., kraft paper or cardboard). The sleeve 112 can be configured to maintain the ordnance 110 at a selected position within the orifice tube 102. In some embodiments, all or a portion of the sleeve 112 can have a radial thickness (e.g. as measured perpendicular to a length of the sleeve) sufficient to fill or at least approximately fill the radial space between the ordnance 110 and the orifice tube 102. Maintaining the ordnance 110 at least approximately at a target or selected position within the orifice tube 102 (e.g., at least approximately at a radial center of the orifice tube 12) can reduce the risk that blast forces from the ordnance 110 are directed toward undesired locations and increase the likelihood that the blast forces are directed to desired locations. For example, reliably positioning the ordnance 110 can help to ensure that blast forces are directed toward the holes 104 of the orifice tube 102. Directing blast forces toward the holes 104 of the orifice tube 102, rather than toward other portions of the orifice tube 12, can reduce the risk of rupturing the orifice tube 12 upon detonation of the ordnance 110. In some embodiments, the sleeve 112 is sufficiently rigid along its length to avoid or substantially avoid creasing, crumpling, buckling, and/or slumping under launch loads or other forces.

Figure 9:
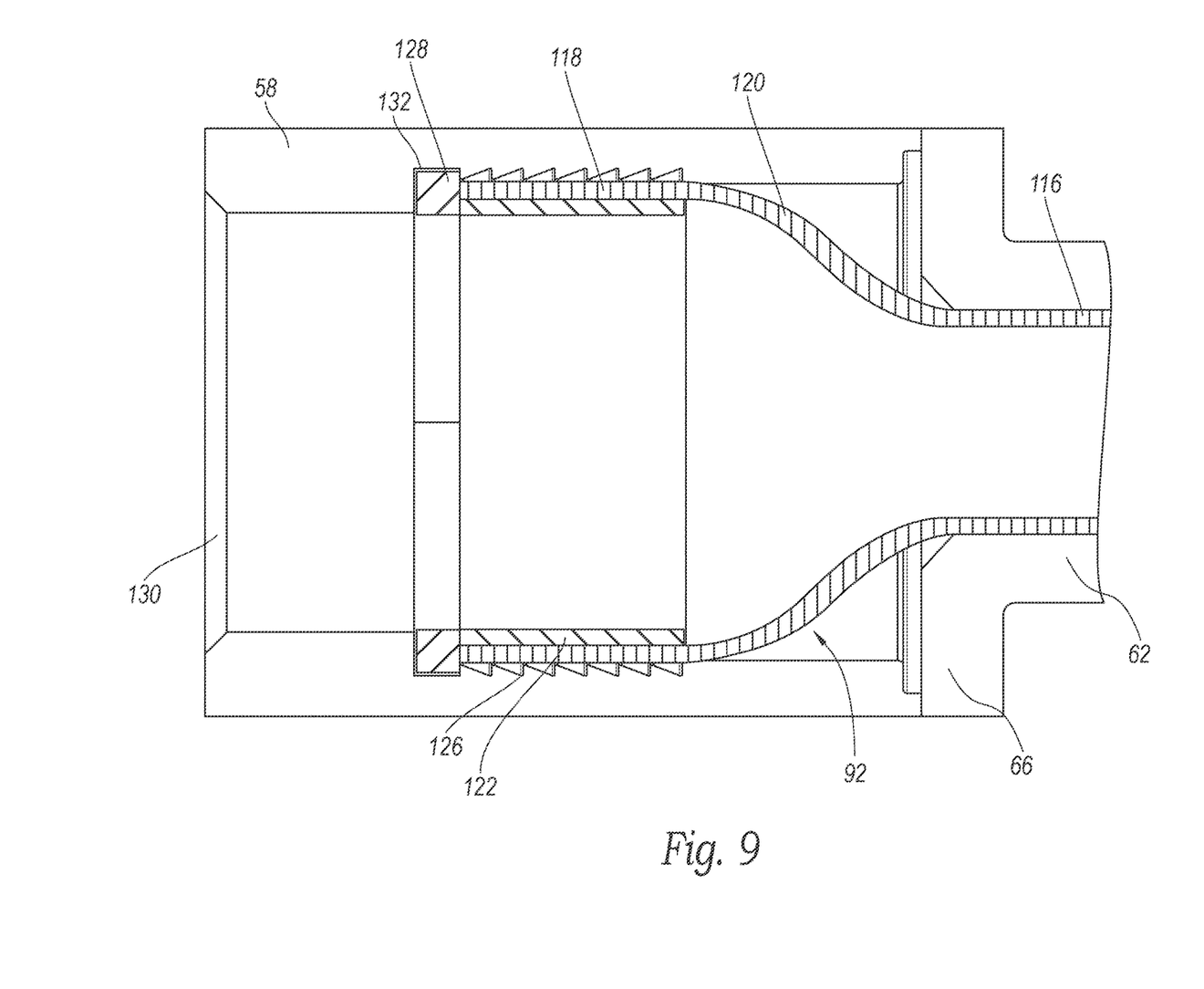
FIG. 9 is a cross-sectional plan view of the representative thrusting rail assembly of FIG. 3, as viewed along the cut plane 9-9 of FIG. 5.

FIG. 9 illustrates an embodiment of a connection between the rail portion 56 (FIG. 3) and the manifold 58. The bellows 92 of the thrusting assembly 90 can transition from a rail portion 116 to a manifold connection portion 118. In some embodiments, the connection portion 118 of the bellows 92 is cylindrical or generally cylindrical. The rail portion 116 of bellows 92 can have the generally U-shaped and/or folded configuration illustrated in FIGS. 6-8. The bellows 92 can include a transition portion 120 extending between the rail portion 116 of the bellows 92 to the connection portion 118 of the bellows 92. In some embodiments, when separated from the thrusting rail assembly 50, the bellows 92 has uniform cross-section along the length of the bellows 92. The uniform cross-section of the bellows 92 is then manipulated (e.g., folded, bent, and/or otherwise manipulated) to fit within both the rail portion 56 and the manifold 58.

The connection portion 118 of the bellows 92 can be affixed to the manifold 58 using a ring 122. The ring 122 can be constructed from a metal material or other material configured to have sufficient rigidity to retain the connection portion in place with respect to the bellows 92. For example, the ring 122 can be constructed from brass, aluminum, and/or some other metal or metal alloy. The interior of the manifold 58 can include a gripping portion 126 configured to grip and/or otherwise reduce the risk of movement of the connection portion 118 of the bellows 92 with respect to the manifold 58. The gripping portion 126 can be, for example, one or more ridges, roughened surfaces, protrusions, or other features configured to increase grip between the bellows 92 and the manifold 58. In some embodiments, the ring 122 is swaged (e.g., cold swaged or hot swaged) when the connection portion 118 of the bellows 92 is positioned between the ring 122 and the gripping portion 126 of the manifold 58. Swaging the ring 122 can increase the tightness of the grip between the gripping portion 126 and the connection portion 118 of the bellows 92. In some embodiments, a seal 128 is positioned between an opening 130 of the manifold 58 and the ring 122. The seal 128 can be an annular seal or a solid disk seal. The seal 128 can be constructed from a polymer, rubber, and/or other suitable flexible and/or resilient material. In some embodiments, the seal 128 is positioned within an annular internal seat 132 of the manifold 58. In some embodiments, a plug, detonator, connection adapter, or other structure is inserted through the opening 130 of the manifold 58 and/or into contact with the seal 132. In some embodiments, the manifold 58 is sealed (e.g., does not have an opening) on the end of the manifold opposite the real portion 56.

A method of separating fairings from a rocket or other launch vehicle can include issuing a command to initiate separation. The command can come from a terrestrial source, and/or from a source local to the launch vehicle. In some embodiments, upon receipt of a command for separation, the stage joint 46 (FIG. 3) or other structure of the fairing 30 can sever the connection between the fairing 30 and the launch vehicle (e.g. the second stage 16 or later stage of the launch vehicle). In some embodiments, the pusher springs 47 or other mechanisms can push the fairing 30 away from the launch vehicle.

Whether or not the fairing 30 is connected at stage joint 46 to the launch vehicle, the detonation of the ordnance 110 of the thrusting assembly 90 can be initiated.

Figure 10:
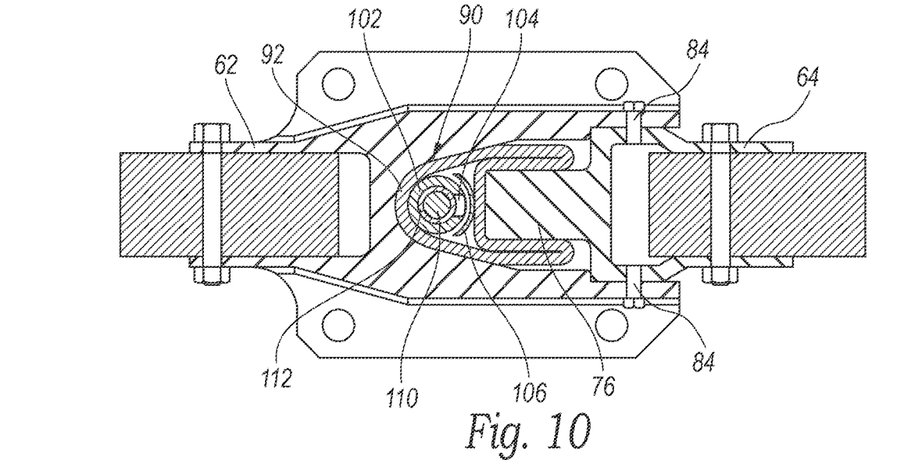
FIG. 10 is a cross-sectional plan view of the representative thrusting rail assembly of FIG. 3 immediately prior to detonation of the ordnance of the thrusting rail assembly, as viewed along the cut plane 6-6 of FIG. 5.

FIGS. 10-13 illustrate a representative detonation sequence for the thrusting assembly 90. As illustrated in FIG. 10, prior to detonation, the piston 76 of the second rail housing portion 64 is positioned near or in contact with a portion of the bellows 92 between the orifice tube 102 and the piston 76. One or more sacrificial (e.g., frangible) pins, rivets, and/or other fasteners 84 connect the first and second rail housing portions 62, 64 at the rail connection interface. The ordnance 110 is positioned approximately at the center of the orifice tube 102 and is retained in that position by the fibrous sleeve 112.

Figure 11:
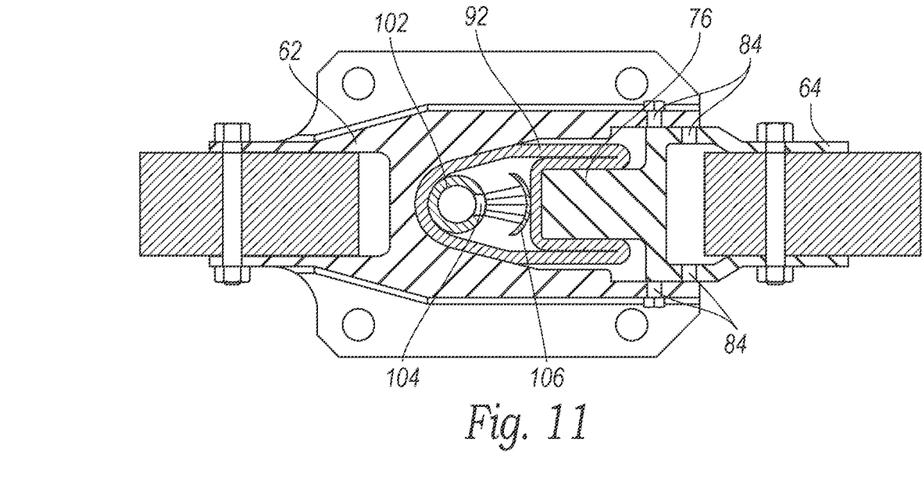
FIG. 11 is a cross-sectional plan view of the representative thrusting rail assembly of FIG. 3 immediately after detonation of the ordnance of the thrusting rail assembly, as viewed along the cut plane 6-6 of FIG. 5.

When the ordnance 110 is detonated, as illustrated in FIG. 11, the sleeve 112 can be at least partially or entirely fracture, disintegrate, or otherwise deconstruct, such that no or generally no shrapnel is produced. For purposes of the present disclosure, the term "shrapnel" means projectiles with sufficient size, mass, rigidity, hardness, and velocity to pierce the bellows 92 and/or damage a payload and/or other system element as a result of impact. In turn, the shield 106 can be pushed against the bellows 92 between the shield 106 and the piston 76. Pressure and impact forces upon the piston 76, via the bellows 92, can shear the sacrificial pins, rivets and/or other fasteners 84 and initiate the first rail housing portion 62 separating from the second rail housing portion 64. As explained above, the first rail housing portion 62 is connected to a first portion of the fairing 30 the second rail housing portions 64 connected to a second portion of the fairing 30.

Figure 12:
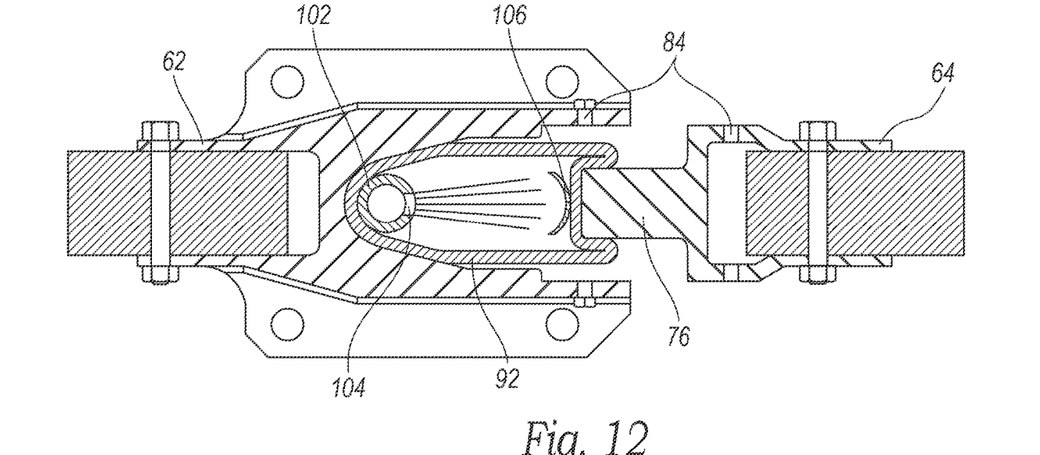
FIG. 12 is a cross-sectional plan view of the representative thrusting rail assembly of FIG. 3 during expansion of the bellows of the thrusting rail assembly, as viewed along the cut plane 6-6 of FIG. 5.
Figure 13:
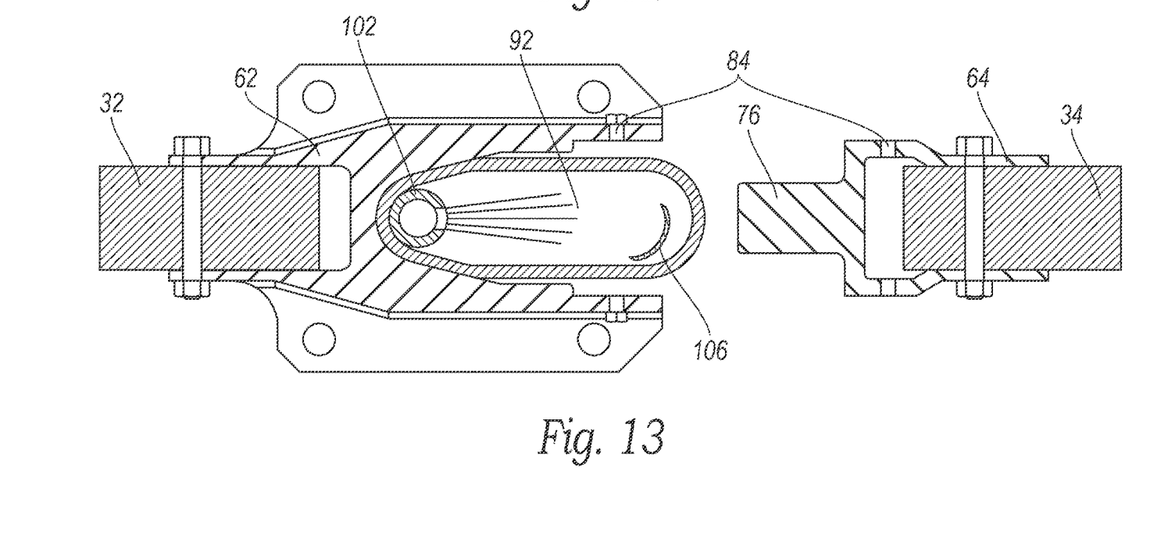
FIG. 13 is a cross-sectional plan view of the representative thrusting rail assembly of FIG. 3 after full expansion of the bellows of the thrusting rail assembly, as viewed along the cut plane 6-6 of FIG. 5.

As illustrated in FIG. 12, the continued pressure increase within the bellows 92 from the detonation of the ordnance 110 can cause the bellows 92 to continue to expand and/or unfold toward the second rail housing portion 64. As the bellows 92 expands, it can exert a separation force between the first rail housing portion 62 and the second rail housing portion 64 (e.g., on the piston 76), further pushing the second rail housing portion 64 away from the first rail housing portion 62. The shape of the bellows cavity 94 (e.g., the inclusion of wings 98, 100), as illustrated in FIG. 7, can allow the bellows 92 to have a long expansion stroke wherein the bellows 92 is in contact with both the first rail housing portion 62 and the piston portion 76 of the second rail housing portion 64.

Figure 14:
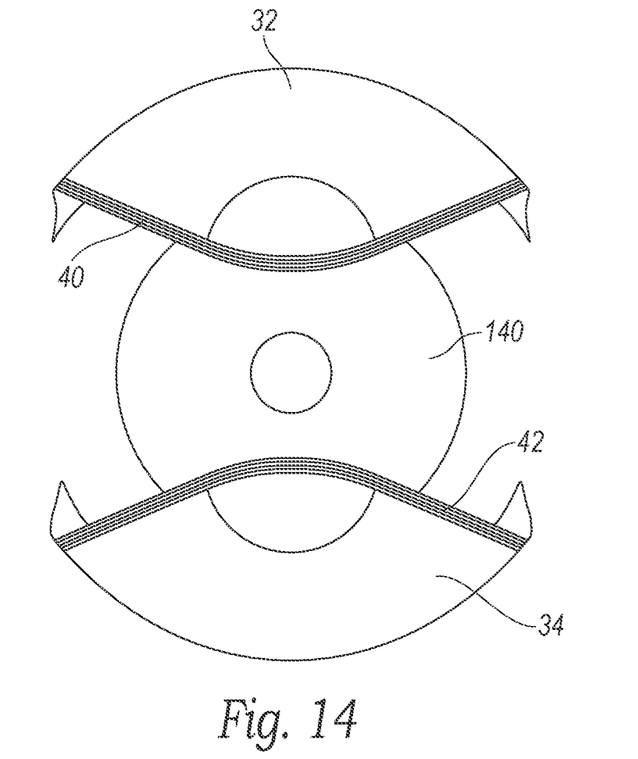
FIG. 14 is a top plan view of the separated fairings of a launch vehicle configured in accordance with representative embodiments of the present technology.
Figure 15:
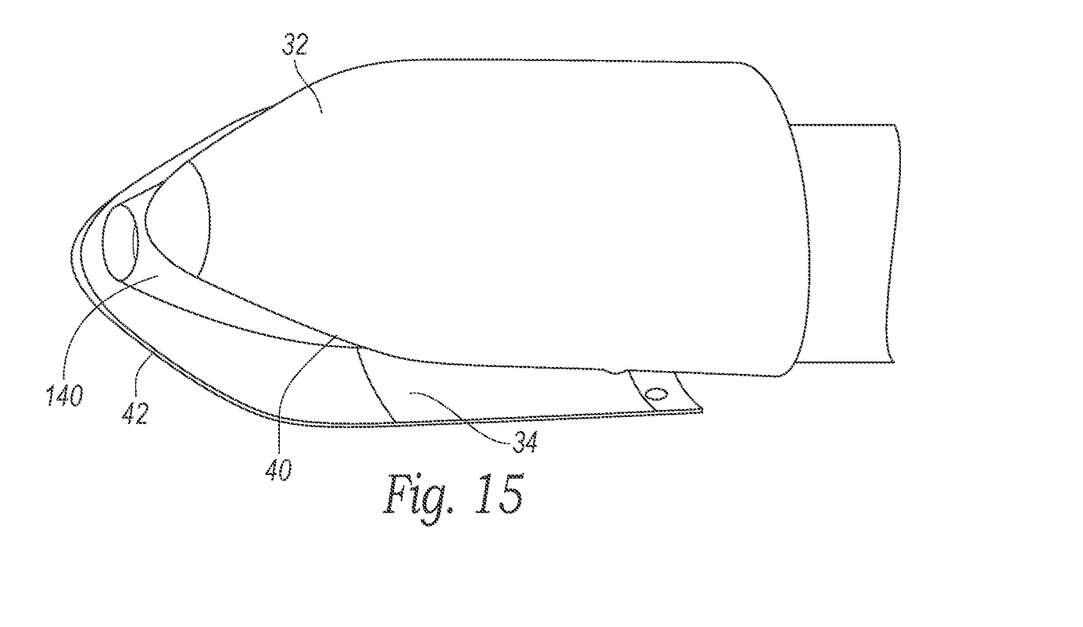
FIG. 15 is a perspective view of the separated fairings of the representative launch vehicle shown in FIG. 14.

When the bellows 92 is fully expanded (FIG. 13), the respective momenta of both the first and second rail housing portions 62, 64 will continue to move the first and second rail housing portions 62, 64 (and their respective fairing body portions to which they are connected) away from each other, and away from the payload/launch vehicle. FIGS. 14 and 15 illustrate the fairing portions 32, 34 separated from the payload 140 and from the launch vehicle.

Reducing or eliminating shrapnel production as the ordnance 110 detonates can inhibit or prevent damage to the payload 140 and/or other components of the launch vehicle.

Given the cost of delivering payloads out of the atmosphere, inhibiting or preventing damage to the payload 140 from detonation of the ordnance 110 can save thousands, millions, or even billions of dollars and provide greater certainty of successful payload delivery. Additionally, utilizing a piston structure 76 having cavities 78 formed therein can reduce the overall weight of the second rail housing portion 64, thereby reducing the magnitude of the force required to reliably push the second rail housing portion 64 away from the first rail housing portion 62 after the ordnance 110 detonates. Using a plurality of separate cavities 78 can also retain structural integrity of the piston 76 both before and during detonation of the ordnance 110. Specifically, material between the cavities 78 in the piston 76 can resist compressive forces upon the piston 76 in directions perpendicular to the length of the piston 76 (e.g., horizontal forces in the frame of reference of FIG. 7). Such resistance to compressive forces can reduce the likelihood that the first and/or second rail housing portions 62, 64 will become deformed prior to separation, which could inhibit or prevent separation.

From the foregoing, it will be appreciated that specific embodiments of the present technology have been described herein for purposes of illustration, but that various modifications that may be made without deviating from the technology. For example, the rail housing portions may include only single flanges or walls configured to connect to portions of a fairing. The seal described above may have configurations other than those specifically disclosed in the Figures. In some embodiments, a single detonating mechanism may detonate the ordnances of all thrusting rail assemblies of a fairing, while in some other embodiments, separate detonating mechanisms may be used to detonate separate thrusting rail assemblies of the fairing.

Certain aspects of the technology described in the context of particular embodiments may be combined or eliminated in other embodiments. Further, while advantages associated with some embodiments of the present technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

While certain embodiments herein are described in connection with launch vehicles, the thrusting rail assemblies and associated structures and methods may, if desired, be used in connection with intra-orbital vehicles or other applications.

As used herein, the term "and/or" as in "A and/or B" refers to A alone, B alone and both A and B. The term "approximately" and "generally" refer to values or characteristics within ±10% of the stated value or characteristic, unless otherwise stated.

We claim:

1. A thrusting rail assembly comprising:
    a first rail housing portion having a first wall, a second wall, and a cavity between the first wall and the second wall;
    a second rail housing portion having a projection positioned at least partially within the cavity;
    a fastener connecting the first rail housing portion to the second rail housing portion;
    a bellows positioned within the cavity and clamped within a first side of a manifold by a ring that is associated with one end of the bellows, wherein the ring is contacted against a seal ring to provide a seal at a second side of the manifold;
    an elongated tube positioned within the bellows, the elongated tube including a vent opening in a lateral wall of the elongated tube;
    a shield positioned between the vent opening at the bellows; and
    a sleeve positioned within the elongated tube, the sleeve constructed from a fibrous material and positioned to retain an ordnance within the elongated tube.

2. The thrusting rail assembly of claim 1, wherein the cavity includes a first cavity portion, a first cavity wing extending from the first cavity portion, and a second cavity wing extending from the first cavity portion.

3. The thrusting rail assembly of claim 2, wherein a first portion of the bellows is positioned within the first cavity wing, a second portion of the bellows is positioned within the second cavity wing, and a third portion of the bellows is positioned within the first cavity portion.

4. The thrusting rail assembly of claim 3, wherein the elongated tube is positioned within the first cavity portion.

5. The thrusting rail assembly of claim 1, wherein the sleeve is constructed from paper.

6. The thrusting rail assembly of claim 1, manifold further comprises a mating cavity with an inner wall configured to receive the at least one end of the bellows and wherein the ring is configured to clamp the at least one end of the bellows against the inner wall of the mating cavity to support the seal at the second side of the manifold.

7. The thrusting rail assembly of claim 6, wherein the ring is metallic and swaged against the first end of the bellows.

8. The thrusting rail assembly of claim 6, wherein the inner wall of the mating cavity includes ridges positioned to grip against the at least one end of the bellows.

9. The thrusting rail assembly of claim 6, wherein the ring is brass.

10. The thrusting rail assembly of claim 1, wherein the bellows has a cylindrical shape before assembly of the thrusting rail assembly.

11. The thrusting rail assembly of claim 1, wherein the sleeve is constructed from kraft paper or foam.

12. A method of assembling a thrusting rail assembly, the method comprising:
    providing a bellows having a first end, a second end, and an elongate annular body extending between the first end and the second end;
    connecting the first end of the bellows to a manifold;
    positioning at least a portion of the bellows in a cavity of a first rail housing portion, wherein the first end of the bellows is clamped by a ring within a first side of the manifold, and wherein the ring is contacted against a seal ring to provide a seal at a second side of the manifold;
    positioning a piston portion of a second rail housing portion in the cavity of the first rail housing portion such that the bellows at least partially surrounds the piston portion of the second rail housing portion on at least three sides;
    positioning an elongated tube within the bellows such that a shield is positioned between the elongated tube and the second rail housing portion; and
    positioning a sleeve within the elongated tube, the sleeve constructed from a fibrous material and configured to retain an ordnance within the elongated tube.

13. The method of claim 12, further comprising clamping the first end of the bellows to an inner surface of the manifold.

14. The method of claim 13, wherein clamping the first end of the bellows to the inner surface of the manifold comprises positioning the first end of the bellows between the ring and the inner surface of the manifold and swaging the ring against the first end of the bellows.

15. The method of claim 13, wherein at least a portion of the inner surface of the manifold is ridged.

16. The method of claim 12, further comprising connecting the first rail housing portion to the second rail housing portion via a fastener.

17. The method of claim 12, wherein the sleeve is constructed from paper.

18. A thrusting rail assembly comprising:
a first rail housing portion having an elongate main body and a pair of flanges extending from the main body;
a second rail housing portion having a piston portion positioned at least partially within a space between the pair of flanges of the first rail housing portion, wherein the piston portion includes a plurality of separate cavities extending through at least part of the piston portion from openings in the second rail housing portion that face away from the space;
a fastener connecting the first rail housing portion to the second rail housing portion;
a bellows positioned at least partially between the pistons portion of the second rail housing portion and the main body of the first rail housing portion; an elongated tube positioned within the bellows, the elongated tube including holes in a lateral wall of the elongated tube;
an ordnance positioned within the elongated tube and configured to detonate in response to a detonation command; and
a sleeve positioned within the elongated tube and configured to retain the ordnance within the elongated tube, wherein the sleeve is configured to fracture, disintegrate, or otherwise deconstruct without producing shrapnel in response to detonation of the ordnance.

19. The thrusting rail assembly of claim 18, wherein the sleeve is constructed from a fibrous material.

20. The thrusting rail assembly of claim 18, wherein the sleeve is configured to retain the ordnance in a center of the elongated tube.

21. The thrusting rail assembly of claim 18, wherein the sleeve is constructed from paper.

22. The thrusting rail assembly of claim 18, wherein the sleeve is constructed from kraft paper or foam.

23. The thrusting rail assembly of claim 18, wherein the main body of the first rail housing portion is at greater than 50 feet long.

24. The thrusting rail assembly of claim 18, wherein the first rail housing portion is connected to a first portion of a fairing of a launch vehicle, and wherein the second rail housing portion is connected to a second portion of the fairing of the launch vehicle.

* * * * *